United States Patent
Akao et al.

(10) Patent No.: US 8,488,098 B2
(45) Date of Patent: Jul. 16, 2013

(54) PHASE-TYPE DIFFRACTION DEVICE, MANUFACTURING METHOD THEREOF AND IMAGE PICK-UP APPARATUS

(75) Inventors: Sosuke Akao, Tokyo (JP); Takeshi Itoi, Tokyo (JP)

(73) Assignee: Toppan Printing Co., Ltd., Tokyo (JP)

(*) Notice: Subject to any disclaimer, the term of this patent is extended or adjusted under 35 U.S.C. 154(b) by 0 days.

(21) Appl. No.: 13/137,475

(22) Filed: Aug. 18, 2011

(65) Prior Publication Data

US 2011/0304782 A1 Dec. 15, 2011

Related U.S. Application Data

(63) Continuation of application No. PCT/JP2010/052061, filed on Feb. 12, 2010.

(30) Foreign Application Priority Data

Feb. 20, 2009 (JP) ................................ 2009-038330

(51) Int. Cl.
 *G02F 1/13* (2006.01)

(52) U.S. Cl.
 USPC ............... 349/201; 349/2; 349/93; 349/107; 349/156; 349/183; 430/321; 430/7

(58) Field of Classification Search
 USPC ........ 349/201, 2, 93, 107, 156, 183; 430/321, 430/7
 See application file for complete search history.

(56) References Cited

U.S. PATENT DOCUMENTS

| | | | | |
|---|---|---|---|---|
| 2005/0207011 | A1* | 9/2005 | Ito et al. ..................... | 359/569 |
| 2007/0077502 | A1* | 4/2007 | Moriya ......................... | 430/7 |
| 2009/0322970 | A1* | 12/2009 | Iwane ........................... | 349/1 |

FOREIGN PATENT DOCUMENTS

| | | | |
|---|---|---|---|
| JP | 63-205605 | | 8/1988 |
| JP | 4-9803 | | 1/1992 |
| JP | 9-288206 | | 11/1998 |
| JP | 2003-121650 | * | 4/2003 |
| JP | 3592383 | | 9/2004 |
| JP | 2006-215186 | * | 8/2006 |
| JP | 2007-93918 | | 4/2007 |
| WO | 2008/004570 A1 | | 1/2008 |
| WO | 2008/099879 A1 | | 8/2008 |

OTHER PUBLICATIONS

International Search Report for PCT/JP2010/052061, Mailed Mar. 23, 2010.
Chinese Office Action mailed Mar. 18, 2013 for corresponding Chinese Application No. 201080007670.6.

* cited by examiner

*Primary Examiner* — Edward Glick
*Assistant Examiner* — Sang V Nguyen

(57) ABSTRACT

A phase-type diffraction device includes a substrate having a front surface and a solidified liquid crystal layer formed on the front surface of the substrate and constituted by a continuous film containing at least a liquid crystal compound. The solidified liquid crystal layer is constituted by first, second and third regions arranged periodically, the third region being interposed between the first region and the second region. The first region is optically anisotropic and the second region is optically isotropic, the third region is not optically isotropic, a degree of orientation of mesogens of the liquid crystal compound being lower than that of the first region. An in-plane average refractive index $n_i$ of the second region is different from an in-plane average refractive index $n_a$ of the first region and an in-plane average refractive index $n_m$ of the third region is between $n_i$ and $n_a$.

28 Claims, 4 Drawing Sheets

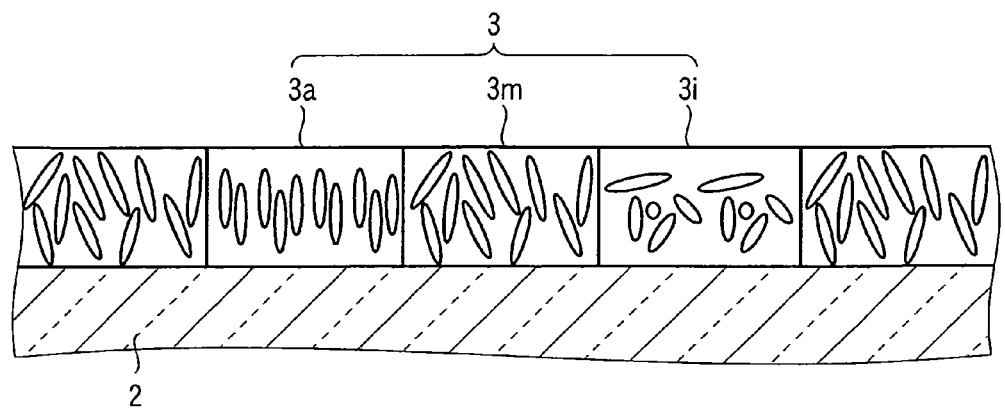
F I G. 3
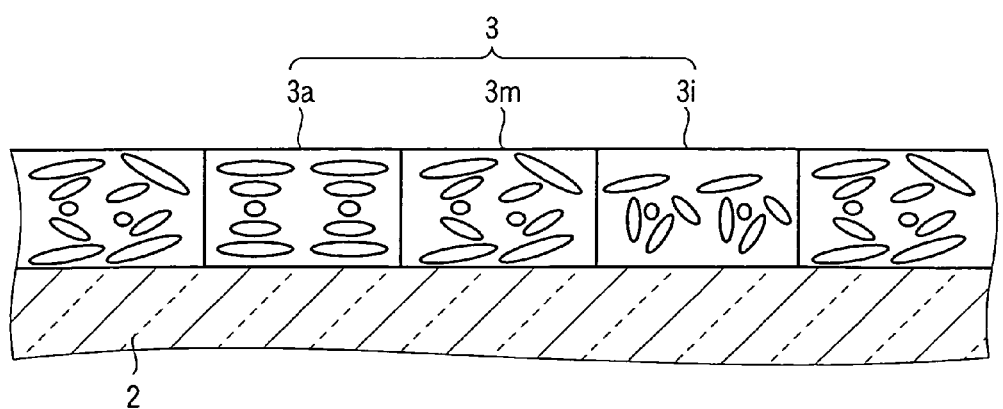
F I G. 4

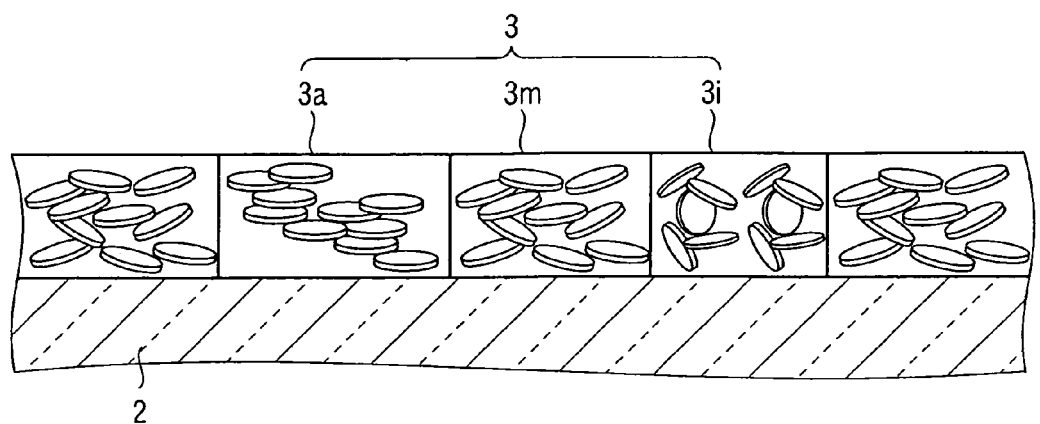
F I G. 5
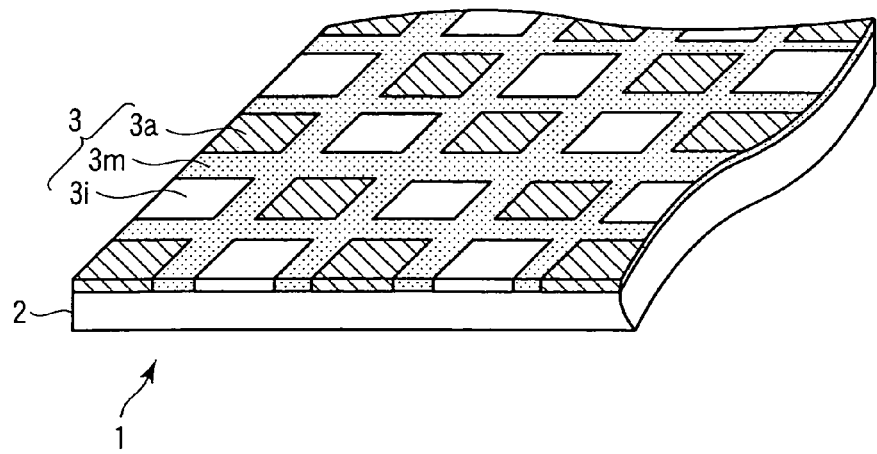
F I G. 6

PHASE-TYPE DIFFRACTION DEVICE, MANUFACTURING METHOD THEREOF AND IMAGE PICK-UP APPARATUS

CROSS-REFERENCE TO RELATED APPLICATIONS

This application is a Continuation Application of PCT Application No. PCT/JP2010/052061, filed Feb. 12, 2010 and based upon and claiming the benefit of priority from prior Japanese Patent Application No. 2009-038330, filed Feb. 20, 2009, the entire contents of all of which are incorporated herein by reference.

BACKGROUND OF THE INVENTION

1. Field of the Invention

This invention relates to a phase-type diffraction device to be used as a low pass filter in an image pick-up device and the like wherein a large number of light-receptive pixels each formed, for example, of a charge-coupled device (CCD), a complementary metal oxide-semiconductor (CMOS) are periodically arranged, and also relates to the manufacturing method of the phase-type diffraction device. This invention also relates to an image pick-up apparatus employing the diffraction device.

2. Description of the Related Art

In an image pick-up optical system employing an image pick-up device constituted by a CCD, CMOS and the like, a colored light component (moire) which is different from the light originating from a subject body is caused to generate concomitant with the generation of false signals. In order to suppress the generation of moire, an optical low pass filter which restricts a high spatial frequency of the light of the subject body is generally employed.

With respect to the optical low pass filter, a birefringence type filter which utilizes the separation of ordinary ray and extraordinary ray in a birefringent substance is conventionally widely used. The materials constituting the birefringence type optical low pass filter which have been most widely employed are formed of inorganic crystals such as quartz, lithium niobate, etc. The birefringence type optical low pass filter made from an inorganic crystal is formed into a plate-like body through processes wherein a single crystal is synthesized at first and then subjected to post workings such as cutting, polishing, etc. Because of these processes, the conventional optical low pass filter is accompanied with the drawbacks that considerable time and labor are required for the manufacture thereof.

With a view to overcome these problems, there has been proposed the employment of a photo-reactive liquid crystal composition as a material for the birefringence type optical low pass filter. For example, Jpn. Pat. No. 3592383 describes a method wherein a thin film of a photo-reactive liquid crystal composition is formed at first and then polymerized in such a manner that the mesogen of liquid crystal is obliquely inclined from the normal direction of the thin film, thereby making it possible to obtain desired optical properties. Alternatively, JP-A 2007-93918 describes a method wherein a thin film of a photo-reactive liquid crystal composition is polymerized in such a manner that the inclined angle of the mesogens from the normal direction is continuously changed in the thickness-wide direction of the thin film, thereby obtaining desired optical properties.

However, it is difficult to uniformly orientate the mesogens in an inclined angle from the normal direction, especially at an angle of 20 to 70 degrees. When it is tried to create a structure wherein the inclined angle of the mesogens from the normal direction is continuously changed in the thickness direction of the thin film, since the separating width of the beam becomes smaller relative to the thickness of film, the thickness of the thin film is required to be increased.

Meanwhile, with respect to the optical low pass filter, a diffraction grating type device which utilizes the separation of light by diffraction is also widely employed other than the system which separates the beam of light using birefringence. With respect to the diffraction grating type low pass filter, one which is most commonly employed is a phase-type diffraction device. As described in JP-A 4-9803 for example, this phase-type diffraction device is constructed such that it comprises a plate having a periodical recessed/projected pattern on its surface created by a transparent material such as a transparent resin, thereby making it possible to create a phase difference of light between the recessed portions and the projected portions.

The phase-type diffraction grating utilizing the recessed/projected pattern is accompanied with a problem that a shadow of the grating is more likely to be generated due to the non-flatness of the surface of the device. Further, this phase-type diffraction grating is accompanied with a problem that it is difficult to enhance the diffraction efficiency, so that this phase-type diffraction grating is not suited for use in an image pick-up apparatus which is intended to obtain images of high-quality.

BRIEF SUMMARY OF THE INVENTION

Objects of the present invention are to overcome the aforementioned problems and to provide a phase-type diffraction device of high quality and to provide a method of easily and stably manufacturing such a phase-type diffraction device. A further object of the present invention is to provide an image pick-up apparatus wherein the aforementioned diffraction device is employed as a low pass filter.

According to a first aspect of the present invention, there is provided a phase-type diffraction device characterized by comprising a substrate having a front surface and a rear surface; and a solidified liquid crystal layer formed on the front surface of the transparent substrate and constituted by a continuous film containing at least a liquid crystal compound; wherein the solidified liquid crystal layer is constituted by first, second and third regions arranged periodically, the third region being interposed between the first region and the second region; the first region is optically anisotropic and the second region is optically isotropic; the third region is not optically isotropic, a degree of orientation of mesogens of the liquid crystal compound being lower than that of the first region; and an in-plane average refractive index $n_i$ of the second region is different from an in-plane average refractive index $n_a$ of the first region and the third region has a value between $n_i$ and $n_a$ as an in-plane average refractive index $n_m$.

According to a second aspect of the present invention, there is provided an image pick-up apparatus comprising an image pick-up device provided with a large number of light-receptive pixels which are periodically arranged and with a phase-type diffraction device described above as a low pass filter.

According to a third aspect of the present invention, there is provided a method of manufacturing a phase-type diffraction device, characterized by comprising forming a solidified liquid crystal layer, directly or through another layer, on a front surface of a transparent substrate, the formation of the solidified liquid crystal layer comprising a film-forming step of forming, on the front surface of a transparent substrate, a liquid crystal material layer comprising a photo-polymerizable or photo-crosslinkable thermotropic liquid crystal compound, mesogens of the thermotropic liquid crystal compound configuring a prescribed oriented structure; an exposure step of exposing at least two regions of the liquid crystal material layer to light, while leaving an unexposed portion, thereby forming in the liquid crystal material layer, a first region comprising a reaction product formed of the polymerized or crosslinked thermotropic liquid crystal compound at a content rate of $P_{max}$, a second region which is free from the reaction product and comprises unreacted thermotropic liquid crystal compound, and a third region comprising the reaction product and unreacted thermotropic liquid crystal compound, wherein a content rate of the reaction product being $P(P<P_{max})$; thereafter, a developing step of heating the liquid crystal material layer to a temperature equal to or higher than a phase transition temperature at which the thermotropic liquid crystal compound changes from the liquid crystal phase to an isotropic phase, thereby disturbing the orientation of the mesogens of the unreacted thermotropic liquid crystal compound in the second and third regions to turn the second region into a state of isotropic phase and to turn the third region into a state wherein the orientation of the mesogen is reduced as a whole; and a fixing step of polymerizing and/or crosslinking the unreacted compound while maintaining the state of isotropic phase in the second region and the orientation being kept reduced in the third region.

According to the present invention, it is possible to provide a phase-type diffraction device of high quality, which can be easily and stably manufactured. Specifically, since a third region is provided so as to avoid the generation of sharp changes of average refractive index, the phase-type diffraction device of the present invention is enabled to suppress higher order interference. Likewise, since a third region is provided so as to suppress the generation of disclination, it is possible to minimize the shadow of the grating that may be dropped onto an image pick-up apparatus. Further, according to the present invention, it is possible to realize an image pick-up apparatus wherein the aforementioned phase-type diffraction device is employed as a low pass filter.

BRIEF DESCRIPTION OF THE SEVERAL VIEWS OF THE DRAWING

FIG. 3 is a cross-sectional view taken along the line I-I of one example of the diffraction device shown in FIG. 2;

FIG. 4 is a cross-sectional view taken along the line I-I of another example of the diffraction device shown in FIG. 2;

FIG. 5 is a cross-sectional view taken along the line I-I of a further example of the diffraction device shown in FIG. 2;

FIG. 6 is a perspective view schematically showing a portion of a diffraction device according to another aspect of the present invention;

DETAILED DESCRIPTION OF THE INVENTION

Next, various aspects of the present invention will be explained in detail with reference to drawings. Incidentally, constituent components exhibiting the same or a similar function are identified by the same reference number throughout all of drawings, thereby omitting the duplicated explanation thereof.

Figure 1:
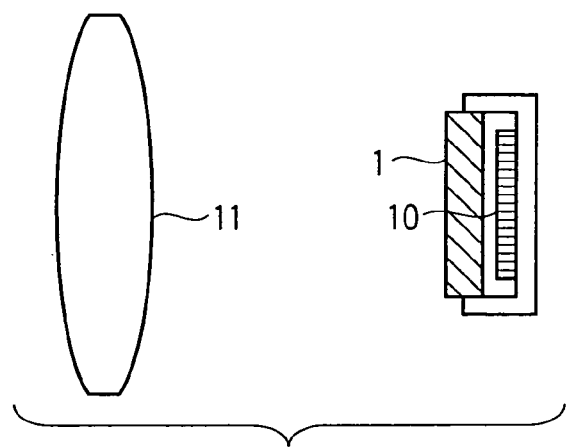
FIG. 1 is a diagram schematically illustrating the optical system of an image pick-up apparatus according to one aspect of the present invention.

FIG. 1 is a diagram schematically illustrating the optical system of an image pick-up apparatus according to one aspect of the present invention. This optical system is constructed such that a diffraction device 1 is interposed between the image pick-up device 10 having a large number of light-receptive pixels arranged periodically thereon and an image pick-up lens 11. This diffraction device 1 is constituted at least by a solidified liquid crystal layer acting as a diffraction grating, and a transparent substrate supporting this solidified liquid crystal layer. As long as it is possible to enable this diffraction device 1 to exhibit desired properties as a low pass filter, it can be disposed at any desired place. However, it is preferable to dispose this diffraction device 1 in the vicinity of the image pick-up device in such a manner that the solidified liquid crystal layer thereof is directed to face the image pick-up device. The reason for disposing the diffraction device 1 in this manner is that the interval between the solidified liquid crystal layer acting as a diffraction grating and the image pick-up device can be easily adjusted to a prescribed value, thereby making it possible to easily utilize the transparent substrate as a protecting layer.

Figure 2:
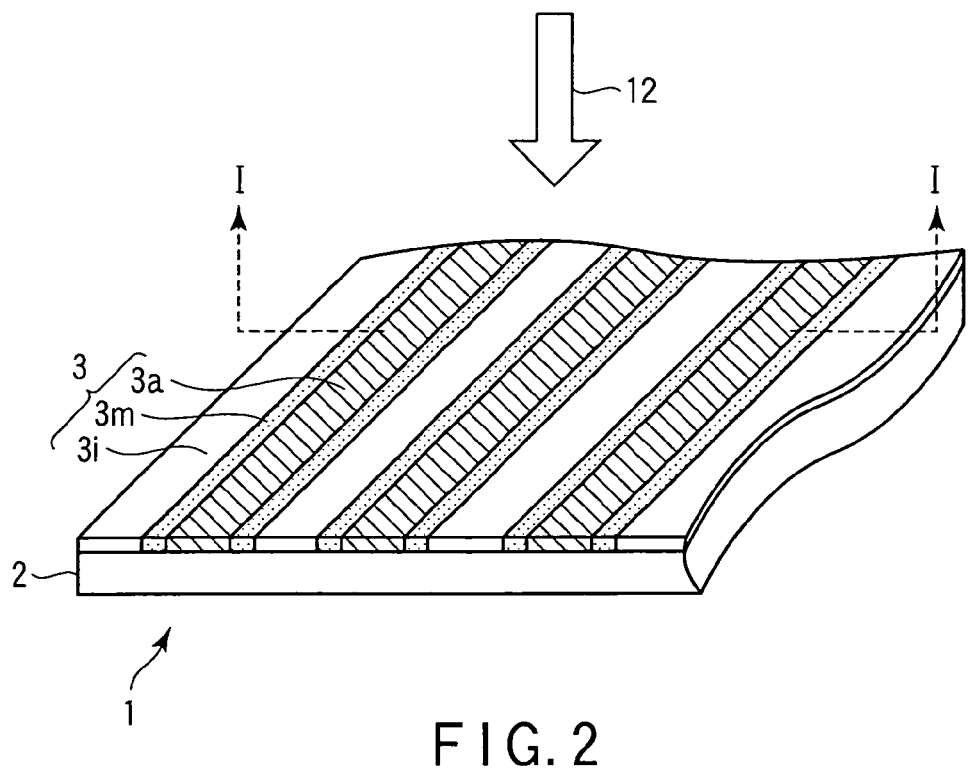
FIG. 2 is a perspective view schematically showing a portion of a diffraction device according to one aspect of the present invention.

FIG. 2 is a perspective view schematically showing a portion of a diffraction device according to one aspect of the present invention. The diffraction device 1 shown herein comprises a transparent substrate 2, and a solidified liquid crystal layer 3 formed on the surface of the transparent substrate 2.

The transparent substrate 2 is typically formed of a light-transmitting substrate made of a glass plate or a resin plate. Examples of the glass plate include, for example, soda-lime glass, low-alkali boro-silicate glass and non-alkali amino boro-silicate glass. Specific examples of the resin plate include, for example, polycarbonate, poly methyl methacrylate and polyethylene terephthalate.

The transparent substrate 2 may not necessarily be formed of a hard material. For example, it is possible to employ a light-transmitting film such as a plastic film or a light-transmitting sheet such as a plastic sheet.

The solidified liquid crystal layer 3 is a continuous film which is formed using a material containing at least a liquid crystal compound and comprises a first region 3a and a second region 3i which are arranged periodically. Between the first region 3a and the second region 3i, there is interposed a third region 3m. In the structure shown in FIG. 2, although these first region 3a and second region 3i are arranged in a pattern of stripes with the third region 3m being interposed therebetween, the pattern thereof may not be limited to this one. As described hereinafter, these first region 3a and second region 3i may be arranged so as to constitute a checkerboard pattern with the third region 3m being interposed therebetween.

Irrespective of the arrangements thereof, the first region 3a is optically anisotropic and the second region 3i is optically isotropic. Further, the third region 3m interposed between these first region 3a and second region 3i is in an intermediate state between the optical states of these first region 3a and second region 3i. The anisotropic region (the first region) 3a, the isotropic region (the second region) 3i and the region of the intermediate state (the third region) 3m are different from each other in apparent refractive index with respect to the light 12 to be entered into each of film surfaces from the normal direction (i.e. different from each other in in-plane average refractive index).

The in-plane average refractive index $n_i$ of the second region 3$i$ differs from the in-plane average refractive index $n_a$ of the first region 3$a$. The third region 3$m$ has the value $n_m$ which falls between $n_i$ and $n_a$ as an in-plane average refractive index. Namely, the value of $n_m$ is not higher than a higher value selected from $n_i$ and $n_a$ but not lower than a lower value selected from $n_i$ and $n_a$. A single region exhibiting an in-plane average refractive index of $n_m$ may constitute the third region 3$m$ acting as an intermediate region.

Alternatively, the third region 3$m$ may be constituted by two or more sub-regions neighboring to each other. In this case, although in-plane average refractive indexes are different in every sub-region, any of the in-plane average refractive indexes of these sub-regions are selected from values falling between $n_i$ and $n_a$. Further, the in-plane average refractive index of the third region 3$m$ may continuously change within the plane. In this case, the in-plane average refractive index of the third region may become the same as $n_a$ of the first region at the boundary between the third region and the first region, and the in-plane average refractive index of the third region may become the same as $n_i$ of the second region at the boundary between the third region and the second region. The term "the same" herein may be construed to mean not necessarily completely in agreement, but differing by an allowance of about ±10 nm. Therefore, the term "the same" herein means "approximately the same". Thus, it can be said that the in-plane average refractive index of the third region may be continuously change within the range between the in-plane average refractive index $n_a$ of the first region and the in-plane average refractive index $n_i$ of the second region.

While the in-plane average refractive indexes of the first, the second and the third regions differ from each other, the apparent refractive index is preferably be the same at the same region of the film surface irrespective of the kind of polarized light component of the light 12 or irrespective of the polarized state of the light 12. All of the regions including the first region 3$a$, the second region 3$i$ and the third region 3$m$, i.e. any region of the solidified liquid crystal layer 3 is preferably isotropy in in-plane directions substantially, in other words, has no in-plane birefringence substantially. Incidentally, by the expression of "not to substantially exhibit", it is intended to indicate a state wherein the in-plane phase difference Δnd to be determined by the product of the film thickness "d" of the solidified liquid crystal layer 3 and the in-plane refractive difference Δn is confined to less than 10 nm.

Namely, it can be said that, throughout the solidified liquid crystal layer 3, although it exhibits anisotropy in the thickness direction thereof, it exhibits isotropy in the in-plane direction thereof. In other words, irrespective of the polarized state of the light, the apparent refractive index is the same as long as the region is the same.

As described above, the region 3$i$ which is optically isotropic, the region 3$a$ which is optically anisotropic, and the region 3$m$ which is in an intermediate state are different from each other in in-plane average refractive index. Due to this difference in in-plane average refractive index, a phase difference generates between the regions 3$i$ and 3$a$ as the incident light 12 is applied to the solidified liquid crystal layer 3. Since these two kinds of regions 3$i$ and 3$a$ are periodically arranged, the solidified liquid crystal layer 3 acts as a phase-type diffraction grating.

Meanwhile, since the in-plane birefringence of the entire solidified liquid crystal layer 3 is substantially zero, the solidified liquid crystal layer 3 has equivalent optical properties to any of polarized light components of the incident light 12. With respect to the phase difference to be provided by both of these regions 3$i$ and 3$a$ against the incident light 12, when it is approximately ½ to the wavelength of the light beam, the diffraction device according to this embodiment is enabled to obtain most excellent properties. Because of this, it is desirable to set the thickness of the solidified liquid crystal layer 3 in such a manner that it provides a phase difference corresponding to ½ of the wavelength of the incident light. Generally, the thickness of the solidified liquid crystal layer 3 may be set to 1~30 μm or so.

With respect to the structure of the region 3$a$ of the solidified liquid crystal layer 3 which is optically anisotropic, it may be optionally selected as long as the in-plane average refractive index thereof differs from that of the optically isotropic region 3$i$. FIGS. 3~5 show schematically various examples of such a structure. Namely, FIGS. 3~5 show respectively a cross-sectional view taken along the line I-I of the diffraction device shown in FIG. 2.

In FIG. 3, the liquid crystal compound to be contained in the solidified liquid crystal layer 3 is formed of rod-like liquid crystals. The mesogens in the optically anisotropic region 3$a$ are immobilized in a homeotropic orientation (case 1). The optically anisotropic region 3$a$ has a smaller in-plane average refractive index as compared with the optically isotropic region 3$i$. Because of this, the region 3$a$ acts to advance the phase of the incident light 12.

The third region 3$m$ is interposed between the first region 3$a$ and the second region 3$i$. In this third region 3$m$, the mesogens of the liquid crystal compound are immobilized, creating a homeotropic orientation which is lower in the degree of orientation as compared with the first region. In this case, the in-plane average refractive indexes of the first, the second and the third regions satisfy the following relationship.

$$n_i \geq n_m \geq n_a \text{ (however, } n_i > n_a\text{)}$$

In FIG. 4, the liquid crystal compound to be contained in the solidified liquid crystal layer 3 is formed of rod-like liquid crystals and the mesogens in the optically anisotropic region 3$a$ are immobilized in a cholesteric orientation (case 2). Since the optically anisotropic region 3$a$ has a larger in-plane average refractive index as compared with the optically isotropic region 3$i$, the optically anisotropic region 3$a$ acts to retard the phase of the incident light 12.

The third region 3$m$ is interposed between the first region 3$a$ and the second region 3$i$. In this third region 3$m$, the mesogens of the liquid crystal compound are immobilized, creating a cholesteric orientation which is lower in the degree of orientation as compared with the first region. In this case, the in-plane average refractive indexes of the first, the second and the third regions satisfy the following relationship.

$$N_a \geq n_m \geq n_i \text{ (however, } n_a > n_i\text{)}$$

In FIG. 5, the liquid crystal compound to be contained in the solidified liquid crystal layer 3 is formed of disc-like liquid crystals and the mesogens in the optically anisotropic region 3$a$ are immobilized in a homeotropic orientation (case 3). Since the optically anisotropic region 3$a$ has a larger in-plane average refractive index as compared with the optically isotropic region 3$i$, the region 3$a$ acts to retard the phase of the incident light 12.

The third region 3$m$ is interposed between the first region 3$a$ and the second region 3$i$. In this third region 3$m$, the mesogens of the liquid crystal compound are immobilized in a homeotropic orientation which is lower in the degree of orientation as compared with the first region. In this case, the in-plane average refractive indexes of the first, the second and the third regions satisfy the following relationship.

$$N_a \geq n_m \geq n_i \text{ (however, } n_a > n_i\text{)}$$

In the diffraction device of this embodiment, the periodically changing structure created in the solidified liquid crystal layer may not necessarily be a one-dimensional configuration. Rather, it is preferable to arrange the optically anisotropic region 3a and the optically isotropic region 3i in a two-dimensional configuration such as a checker-like pattern with the intermediate region 3m being interposed between these regions 3a and 3i. The reason for this is that when these regions are formed in a two-dimensional configuration, it is possible, in this case, to enable these regions to agree with the construction of the image pick-up device where light-receptive pixels are generally arranged as a two-dimensional pattern. In order to separate the incident light 12 in conformity with the arrangement of the light-receptive pixels of the image pick-up device that are arranged up and down as well as right and left, the grating constituted by the optically isotropic region 3i and the optically anisotropic region 3a, which are arranged with the intermediate region 3m being interposed therebetween, should preferably be obliquely arranged at an angle of approximately 45° rather than being arranged up and down as well as right and left on the substrate of the diffraction device. FIG. 6 illustrates, as one embodiment, a portion of the diffraction device having the solidified liquid crystal layer 3 formed with such an arrangement.

If the diffraction device of this embodiment is to be employed as a low pass filter suitable for use in an image pick-up device having a large number of light-receptive pixels arranged periodically, the period to be created by the optically isotropic region 3i and the optically anisotropic region 3a should preferably be not less than 20 μm. Incidentally, by the term "period", it is intended to indicate a length of one group consisting of the region 3i and the region 3a in the direction in which the region 3a and the region 3i are repeatedly arranged. Namely, when these two regions are arranged forming a pattern of stripes as shown in FIG. 2, the term "period" indicates a total of the width of the first region 3a, the width of the third region 3m and the width of the second region 3i. When these two regions are arranged forming a checkerboard pattern as shown in FIG. 6, the term "period" indicates a total of the length of one side of the region 3a, the length of one side of the region 3i and the width of the third region 3m formed between the region 3a and the region 3i.

The pitch of light-receptive pixels in the image pick-up device is usually constituted by a period of 10 μm or less. When the period of these regions formed in the diffraction device is less than 20 μm, the width of the separation of light becomes too large relative to the pitch of the light-receptive pixels of the image pick-up device. In addition to this problem, it would become difficult to reliably create the optically isotropic region 3i and the optically anisotropic region 3a of the solidified liquid crystal layer 3 using a material containing a liquid crystal compound.

Figure 7:
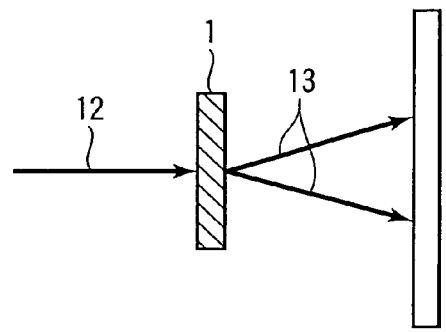
FIG. 7 is a cross-sectional view illustrating the state of separation of incident light.
Figure 8:
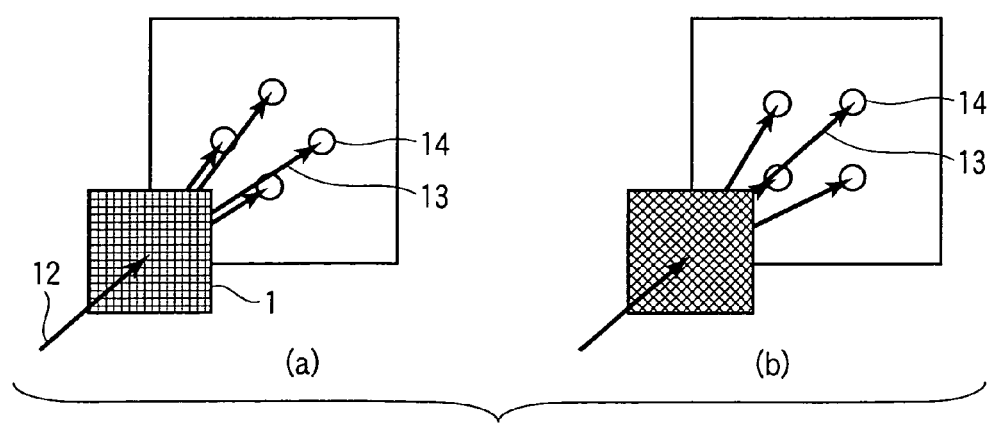
FIG. 8 is a diagram illustrating the state of separation of incident light.

FIG. 7 is a cross-sectional view illustrating the state of separation of incident light 12. As shown in FIG. 7, separated diffraction beams 13 generate as the incident light 12 passes through the diffraction device 1. FIG. 8 is a diagram illustrating the state of separation of incident light. When the incident light 12 is separated by the diffraction device 1, separated light spots 14 generate. FIG. 8(a) shows one embodiment wherein the grating consisting of the optically isotropic region 3i and the optically anisotropic region 3a is arranged up and down as well as right and left. FIG. 8(b) shows another embodiment wherein these two regions are obliquely arranged at an angle of approximately 45°.

The diffraction device according to one aspect of the present invention is designed to provide a difference of in-plane average refractive index among the optically isotropic region 3i, the optically anisotropic region 3a and the intermediate region 3m of the solidified liquid crystal layer 3, thereby creating a phase difference in the incident light 12 between these regions. It is not required to create a difference of film thickness among the optically isotropic region 3i, the optically anisotropic region 3a and the intermediate region 3m. Namely, the solidified liquid crystal layer 3 may be uniform in film thickness entirely. Of cause, it is possible to create a difference of film thickness among these regions. However, in viewpoint of preventing the shadow of the grating from falling onto the image pick-up device, the difference in film thickness of these three regions should be as small as possible. More preferably, the difference in film thickness of these regions is reduced to zero.

Incidentally, in the case of the diffraction device according to this embodiment, an antireflection film may be attached to the surface (rear face) where the solidified liquid crystal layer 3 of transparent substrate 2 is not formed. Due to the antireflection film, it is possible to minimize any redundant light reflection on the surface of the substrate, thereby making it possible to suppress the deterioration of quality of the picture image to be displayed on the surface of image pick-up apparatus that may be brought about by the irregular reflection of the light reflection in the interior of the image pick-up apparatus when building the diffraction device of this embodiment into the image pick-up apparatus.

Further, an antistatic film may be attached to a surface of the solidified liquid crystal layer 3 which is opposite to the surface thereof where the transparent substrate 2 is disposed. Due to the antistatic film, it is possible to prevent the solidified liquid crystal layer 3 from being electrified and hence to suppress the adhesion of undesirable foreign matter. This antistatic film can be formed by forming an electrically conductive thin film such as an indium tin oxide film on the surface of solidified liquid crystal layer 3.

Next, a method of forming the solidified liquid crystal layer 3 will be explained as follows.

The solidified liquid crystal layer 3 can be obtained, for example, through a method wherein a liquid crystal material layer containing a photo-polymerizable or a photo-crosslinkable thermotropic liquid crystal material is formed on transparent substrate 2 and then the resultant liquid crystal material layer is subjected to patterning exposure and to heat treatment.

The liquid crystal material layer can be obtained, for example, through a method wherein a solution of liquid crystal containing a thermotropic liquid crystal compound and a solvent is coated on transparent substrate 2 and then the resultant coated layer is subjected, if required, to drying. In this liquid crystal material layer, the mesogens of the thermotropic liquid crystal compound are orientated in a prescribed manner.

Examples of the thermotropic liquid crystal compound include, for example, alkyl cyanobiphenyl, alkoxy biphenyl, alkyl terphenyl, phenyl cyclohexanone, biphenyl cyclohexane, phenyl bicyclohexane, pyrimidine, cyclohexane carbonate, halogenated cyanophenol ester, alkyl benzoate, alkyl cyanotolane, dialkoxytolane, alkyl alkoxytolane, alkyl cyclohexyltolane, alkyl bicyclohexane, cyclohexyl phenylethylene, alkylcyclohexyl cyclohexene, alkyl benzaldehyde azine, alkenyl benzaldehyde azine, phenyl naphthalene, phenyl tetrahydronaphthalene, phenyl decahydronaphthalene, triphenylene, pentaethynyl benzene, hydroxypropyl cellulose, acenaphthoquinoxaline, indanthrone, cyanine indanthrone, perylene dibenzoimidazole tetracarbonate, naphthoylene benzoimidazole, chromoglic acid, methylphenyl diazenyl naphthalene sulfonic acid, derivatives of these compounds and acrylates of these compounds. These liquid crystal compounds may be employed singly or in combination thereof.

Examples of the solvent include, for example, cyclohexanone, ethyl Cellosolve acetate, butyl Cellosolve acetate, 1-methoxy-2-propyl acetate, diethyleneglycol dimethyl ether, ethyl benzene, ethyleneglycol diethyl ether, xylene, ethyl Cellosolve, methyl-n-amyl ketone, propyleneglycol monomethyl ether, toluene, methylethyl ketone, ethyl acetate, methanol, ethanol, isopropyl alcohol, butanol, isobutyl ketone, petroleum solvent, etc. These solvents may be employed singly or in combination thereof.

In addition to the above-mentioned components, the solution of liquid crystal may further contain, for example, a chiral agent, a resin, a polyfunctional monomer and/or oligomer, a photopolymerization initiator, a sensitizer, a thermopolymerization initiator, a chain-transfer agent, a surfactant, a polymerization inhibitor, a storage stabilizer, an adherence improver, etc. to such an extent that would not cause the composition containing any of these liquid crystal compounds to adversely affect the liquid crystallinity of the composition.

The chiral agent is a low molecular weight compound having an optically active moiety, main examples of the low molecular weight compound being those having a molecular weight of 1500 or less. The chiral agent is employed for the purpose of inducing a helical structure to the positive uniaxial nematic regularity to be developed by a polymerizable liquid crystal material exhibiting nematic regularity. As long as this purpose can be attained, there is no limitation as to the kind of chiral agent to be employed. The compound that can be used as a chiral agent may be selected from any kind of compound as long as it is capable of being compatibilized with a polymerizable liquid crystal compound exhibiting nematic regularity in a dissolved state or in a fused state and also capable of inducing a desired helical structure to the liquid crystal compound without damaging the liquid crystallinity of the polymerizable liquid crystal compound.

Since the chiral agent is intended to be used for inducing a helical structure to the liquid crystal compound, the molecule of the chiral agent is required to exhibit chirality. Therefore, the chiral agent to be employed herein should preferably be selected from the group consisting of a compound having at least one asymmetric carbon atom, a compound having an asymmetric point on a heteroatom such as chiral amine or chiral sulfoxide, and a compound having axial asymmetry and an optically active moiety such as cumulene and binaphthol. More specifically, it is possible to employ a chiral nematic liquid crystal (for example, Paliocolor LC756 available from BASF Co.) or chiral dopant liquid crystal "S-811" (available from Merck Co.).

Although it depends on the power of inducing the helical structure, the effects of the chiral agent can be attained as long as the chiral agent is contained in a thermotropic liquid crystal compound at a ratio of 2 to 30 parts by weight or so based on 100 parts by weight of a thermotropic liquid crystal compound.

With respect to the resin, it may be a thermoplastic resin or thermosetting resin. Examples of the thermoplastic resin include, for example, butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene, polyamide resin, rubber type resin, cyclized rubber-based resin, celluloses, polybutadien, polyethylene, polypropylene, polyimide, etc. Examples of the thermosetting resin include, for example, epoxy resin, benzoguanamine resin, rosin-modified maleic resin, rosin-modified fumaric acid resin, melamine resin, urea resin, phenol resin, etc.

Further, it is also possible to employ a photosensitive resin. As for the photosensitive resin, it is possible to employ resins having a linear macromolecule into which a photo-curable group such as an acryloyl group, (metha)acryloyl group, styryl group, etc. has been introduced through a reaction between a linear macromolecule having a reactive substituent group such as a hydroxyl group, carboxyl group, amino group, etc. and an acrylic compound or (metha)acrylic compound having a reactive substituent group such as an isocyanate group, aldehyde group, epoxy group, etc. or cinnamic acid. It is also possible to employ a resin wherein a linear macromolecule containing an acid anhydride such as a styrene-maleic anhydride copolymer or α-olefin-maleic anhydride copolymer is half-esterified with an acrylic compound or (metha)acrylic compound having a hydroxyl group such as hydroxyalkyl acrylate or hydroxyalkyl (metha)acrylate.

As the monomers and oligomers which are the precursors of the resin, they include, for example, various kinds of acrylic esters and methacrylic esters such as 2-hydroxyethyl acrylate, 2-hydroxyethyl(metha)acrylate, 2-hydroxypropyl acrylate, 2-hydroxypropyl(metha)acrylate, cyclohexyl acrylate, cyclohexyl(metha)acrylate, polyethyleneglycol diacrylate, polyethyleneglycol di(metha)acrylate, pentaerythritol triacrylate, pentaerythritol tri(metha)acrylate, trimethylolpropane triacrylate, trimethylolpropane tri(metha)acrylate, dipentaerythritol hexaacrylate, dipentaerythritol hexa(metha)acrylate, tricyclodecanyl acrylate, tricyclodecanyl (metha)acrylate, melamine acrylate, melamine (metha)acrylate, epoxy acrylate, epoxy(metha)acrylate, etc.; acrylic acid; (metha)acrylic acid; styrene; vinyl acetate; acryl amide; (metha)acryl amide; N-hydroxymethyl acryl amide; N-hydroxymethyl (metha)acryl amide; acrylonitrile; etc. These compounds can be employed either singly or as a mixture of two or more kinds thereof.

When the liquid crystal layer is cured through the irradiation of light such as ultraviolet rays, a photo-polymerization initiator, for example, can be incorporated in a liquid crystal solution.

Examples of the photo-polymerization initiator include an acetophenone-based photo-polymerization initiator such as 4-phenoxy dichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-methyl-1[4-(methylthio)phenyl]-2-morpholinopropane-1-one, 2-benzyl-2-dimethylamino-1-(4-morpholinophenyl)-butan-1-one; a benzoin-based photo-polymerization initiator such as benzoin, benzoin methyl ether, benzoin ethyl ether, benzoin isopropyl ether, benzyldimethyl ketal, etc.; a benzophenone-based photo-polymerization initiator such as benzophenone, benzoylbenzoic acid, benzoylmethyl benzoate, 4-phenyl benzophenone, hydroxybenzophenone, acrylated benzophenone, 4-benzoyl-4'-methyldiphenyl sulfide, etc.; a thioxanthone-based photo-polymerization initiator such as thioxanthone, 2-chlorothioxanthone, 2-methylthioxanthone, isopropylthioxanthone, 2,4-diisopropylthioxanthone, etc.; a triazine-based photo-polymerization initiator such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2,4-trichloromethyl- (piperonyl)-6-triazine, 2,4-trichloromethyl(4'-methoxystyryl)-6-triazine, etc.; a borate-based photo-polymerization initiator; a carbazol-based photo-polymerization initiator; an imidazole-based photo-polymerization initiator, etc.

These photo-polymerization initiators can be employed singly or in combination of two or more kinds thereof. The content of the photo-polymerization initiator should preferably be confined to 0.1~30 parts by weight, more preferably 0.3~10 parts by weight, based on 100 parts by weight of the liquid crystalline compound in a liquid crystal solution.

These photo-polymerization initiators can be employed in combination with a sensitizer, examples of which include α-acyloxy ester, acylphosphine oxide, methylphenyl glyoxylate, benzyl, 9,10-phenanthrene quinone, camphor quinine, ethylanthraquinone, 4,4'-diethyl isophthalophenone, 3,3',4,4'-tetra(t-butyl peroxycarbonyl)benzophenone, 4,4'-diethylaminobenzophenone, etc.

These sensitizers can be employed at an amount ranging from 0.1 to 60 parts by weight based on 100 parts by weight of the photo-polymerization initiator.

Examples of the thermopolymerization initiator include, for example, peroxide initiators such as benzoyl peroxide (BPO), t-butylperoxy-2-ethylhexanate (PBO), di-t-butylperoxide (PBD), t-butylperoxyisopropyl carbonate (PBI), n-butyl-4,4-bis(t-butylperoxy) paralate (PIIV), etc.; and azo-based initiators such as 2,2'-azobisisobutyronitrile, 2,2'-azobis(2-methylbutyronitrile), 1,1'-azobis(cyclohexane-1-carbonitrile), 2,2'-azobis(2-methylpropane), 2,2'-azobis(2-methylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(3-methylpentane), 3,3'-azobis(3-methylhexane), 3,3'-azobis(3,4-dimethylpentane), 3,3'-azobis(3-ethylpentane), dimethyl-2,2'-azobis(2-methylpropionate), diethyl-2,2'-azobis(2-methylpropionate), di-tert-dimethyl-2,2'-azobis(2-methylpropionate), etc.

These thermopolymerization initiators can be employed singly or in combination of two or more kinds thereof. The content thereof may be 0.01 to 5 parts by weight based on 100 parts by weight of the liquid crystalline compound in a liquid crystal solution.

The liquid crystalline solution may further comprise a chain-transfer agent such as a polyfunctional thiol.

The polyfunctional thiol is a compound having two or more thiol groups. Examples of this polyfunctional thiol include, for example, hexane dithiol, decane dithiol, 1,4-butanediol bisthiopropionate, 1,4-butanediol bisthioglycolate, ethyleneglycol bisthioglycolate, ethyleneglycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc. These polyfunctional thiols can be employed singly or in combination of two or more kinds.

The content of these polyfunctional thiols is preferably be confined within the range of 0.2 to 30 parts by weight, more preferably 0.5 to 15 parts by weight based on 100 parts by weight of the liquid crystalline compound in a liquid crystal solution.

Examples of the surfactant include, for example, an anionic surfactant such as polyoxyethylene alkylether sulfate, dodecylbenzene sodium sulfonate, alkali salts of styrene-acrylic acid copolymer, alkylnaphthaline sodium sulfonate, alkyldiphenyl ether sodium disulfonate, monoethanol amine lauryl sulfate, triethanol amine lauryl sulfate, ammonium lauryl sulfate, monoethanol amine stearate, sodium stearate, sodium lauryl sulfate, monoethanol amine of styrene-acrylic acid copolymer, polyoxyethylene alkylether phosphate, etc.; a nonionic surfactant such as polyoxyethylene oleyl ether, polyoxyethylene lauryl ether, polyoxyethylene nonylphenyl ether, polyoxyethylene alkylether phosphate, polyoxyethylene sorbitan monostearate, polyethyleneglycol monolaurate, etc.; cationic surfactant such as alkyl quaternary ammonium salt and an ethylene oxide adduct thereof, etc.; and an amphoteric surfactant such as alkyl betaine such as betaine alkyldimethyl aminoacetate, alkylimidazoline, etc. These surfactants can be employed singly or in combination of two or more kinds.

Examples of the polymerization inhibitor include, for example, phenol-based inhibitors such as 2,6-di-t-butyl-p-cresol, 3-t-butyl-4-hydroxyanisole, 2-t-butyl-4-hydroxyanisole, 2,2'-methylene bis(4-methyl-6-t-butylphenol), 2,2'-methylene bis(4-ethyl-6-t-butylphenol), 4,4'-butylidene bis(3-methyl-6-t-butylphenol), 4,4'-thiobis(3-methyl-6-t-butylphenol), styrenated phenol, styrenated p-cresol, 1,1,3-tris(2-methyl-4-hydroxy-5-t-butylphenyl) butane, tetrakis [methylene-3-(3',5'-di-1-butyl-4'-hydroxyphenyl) propionate]methane, octadecyl-3-(3,5-di-t-butyl-4-hydroxyphenyl propionate), 1,3,5-trimethyl-2,4,6-tris(3,5-di-t-butyl-4-hydroxybenzyl)benzene, 2,2'-dihydroxy-3,3'-di(α-methylcyclohexyl)-5,5'-dimethyldiphenyl methane, 4,4'-methylene bis(2,6-di-t-butylphenol), tris(3,5-di-t-butyl-4-hydroxyphenyl) isocyanurate, 1,3,5-tris(3',5'-di-t-butyl-4-hydroxybenzoyl) isocyanurate, bis[2-methyl-4-(3-n-alkylthiopropionyloxy)-5-t-butylphenyl]sulfide, 1-oxy-3-methyl-isopropyl benzene, 2,5-di-t-butylhydroquinone, 2,2'-methylene bis(4-methyl-6-nonylphenol), alkylated bisphenol, 2,5-di-t-amylhydroquinone, polybutylated bisphenol A, bisphenol A, 2,6-di-t-butyl-p-ethylphenol, 2,6-bis(2'-hydroxy-3-t-butyl-5'-methyl-benzyl)-4-methylphenol, 1,3,5-tris(4-t-butyl-3-hydroxy-2,6-dimethylbenzyl) isocyanurate, terephthaloyl-di(2,6-dimethyl-4-t-butyl-3-hydroxybenzyl sulfide), 2,6-di-t-butylphenol, 2,6-di-t-butyl-α-dimethylamino-p-cresol, 2,2'-methylene-bis(4-methyl-6-cyclohexylphenol), triethyleneglycol-bis[3-(3-t-butyl-5-methyl-4-hydroxyphenyl) propionate], hexamethylene glycol-(3,5-di-t-butyl-4-hydroxyphenyl) propionate, 3,5-di-t-butyl-4-hydroxytoluene, 6-(4-hydroxy-3,5-di-t-butylaniline)-2,4-bis(octylthio)-1,3,5-triazine, N,N'-hexamethylene bis(3,5-di-t-butyl-4-hydroxy-hydrocynamide), 3,5-di-t-butyl-4-hydroxybenzyl-diethyl phosphate, 2,4-dimethyl-6-t-butylphenol, 4,4'-methylene bis(2,6-di-t-butylphenol), 4,4'-thio bis(2-methyl-6-t-butylphenol), tris[β-(3,5-di-t-butyl-4-hydroxyphenyl)propionyl-oxyethyl]isocyanulate, 2,4,6-tributylphenol, bis[3,3-bis(4'-hydroxy-3'-t-butylphenyl)-butylic acid]glycol ester, 4-hydroxymethyl-2,6-di-t-butylphenol, bis(3-methyl-4-hydroxy-5-t-butylbenzene) sulfide, etc. Further, it is also possible to employ amine-based inhibitors such as N-phenyl-N'-isopropyl-p-phenylene diamine, N-phenyl-N'-(1,3-dimethylbutyl)-p-phenylene diamine, N,N'-diphenyl-p-phenylene diamine, 2,2,4-trimethyl-1,2-dihydroquinoline polymer, diaryl-p-phenylene diamine, etc.; sulfur-based inhibitors such as dilauryl.thiodipropionate, distearyl.thiodipropionate, 2-mercaptobenz imidazole, etc.; and phosphor-based inhibitors such as distearyl pentaerythritol diphosphite, etc.

The liquid crystal solution may further contain a storage stabilizing agent for enhancing the stability of the time viscosity of the solution. Examples of the storage stabilizing agent include, for example, benzyltrimethyl chloride, quaternary ammonium chlorides such as diethylhydroxy amine, etc.; organic acids such as lactic acid, oxalic acid, etc. and methyl ethers thereof; t-butyl pyrocatechol; organic phosphines such as triethyl phosphine, triphenyl phosphine, etc.; phosphite; or a mixture containing two or more kinds of these compounds.

Further, the liquid crystal solution may contain an adherence improver such as a silane coupling agent for the purpose of enhancing the adhesion thereof to a substrate.

Examples of the silane coupling agent include vinyl silanes such as vinyl tris(β-methoxyethoxy) silane, vinylethoxy silane, vinyltrimethoxy silane, etc.; acrylsilanes or (metha) acrylsilanes such as γ-methacryloxypropyl trimethoxy silane, etc.; epoxy silanes such as β-(3,4-epoxycyclohexyl) ethyltrimethoxy silane, β-(3,4-epoxycyclohexyl) methyltrimethoxy silane, β-(3,4-epoxycyclohexyl) ethyltriethoxy silane, β-(3, 4-epoxycyclohexyl) methyltriethoxy silane, γ-glycidoxypropyl trimethoxy silane, γ-glycidoxypropyl triethoxy silane, etc.; amino silanes such as N-β (aminoethyl) γ-aminopropyl trimethoxy silane, N-β (aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane, N-phenyl-γ-aminopropyl triethoxy silane, etc.; and thiosilanes such as γ-mercaptopropyl trimethoxy silane, γ-mercaptopropyl triethoxy silane, etc.; and mixtures containing two or more kinds of the above-described silane coupling agents.

These silane coupling agents can be incorporated in the liquid crystal solution at an amount of, for example, 0.01~100 parts by mass based on 100 parts by mass of a thermotropic liquid crystal.

A solidified liquid crystal layer can be formed using a liquid crystal solution containing the aforementioned thermotropic liquid crystal compound, a solvent and, if required, other additives. The coating of the liquid crystal solution can be achieved by, for example, a printing method such as spin-coating, slit-coating, letterpress printing, screen printing, lithography, reverse printing, gravure printing, etc.; a method wherein any of these printing methods is used in combination with an offset system; an inkjet method; a bar-coating method, etc.

Before coating of the liquid crystal solution, the surface of the transparent substrate may be subjected to an alignment treatment such as rubbing. Alternatively, prior to the coating of the liquid crystal solution, an alignment film for regulating the orientation of the liquid crystal compound may be formed on the surface of the transparent substrate. This alignment film can be created by a process wherein a transparent resin layer such as a polyimide layer is formed on the surface of the transparent substrate and then this transparent resin layer is subjected to an alignment treatment such as rubbing. This alignment film may be formed by optical alignment techniques.

The liquid crystal material layer is formed as a continuous film having a uniform thickness. According to the aforementioned method, the liquid crystal material layer can be formed as a continuous film having a uniform thickness, provided that the surface to be coated is sufficiently flat. In the liquid crystal material layer thus formed, the mesogens of the thermotropic liquid crystal compound are aligned to have a prescribed orientation.

By the expression of "prescribed orientation", it is intended to mean that it may be any kind of orientation as long as the orientation does not generate an in-plane birefringence. For example, the thermotropic liquid crystal compound is constituted by rod-like liquid crystals and the major axis of mesogens is directed in the direction normal to the liquid crystal material layer, thus creating a homeotropic orientation (case 1). When a chiral agent exists in the liquid crystal material layer together with the rod-like thermotropic liquid crystal compound, mesogens are helically orientated, thus creating a cholesteric orientation (case 2). Alternatively, the thermotropic liquid crystal compound may be constituted by disc-like liquid crystals and the normal direction of the surface of the mesogens is arrayed parallel with the normal direction of the liquid crystal material layer, thus creating a homeotropic orientation (case 3).

The liquid crystal material layer wherein mesogens of the liquid crystal compound constitute a prescribed structure of orientation is then subjected to a prescribed patterning exposure. In the regions to be exposed, at least two regions are irradiated with light under different exposure conditions. The expression "different exposure conditions" means that the exposure period of time, illumination intensity, brightness or any combination thereof are varied in the exposure of each of these regions. Usually, the exposure process is carried out in such a manner that the illumination energy, i.e. exposure quantity, is varied in accordance with each of these regions. Since the characteristics of reciprocity law failure can be recognized depending on the kind of material, the amount of exposure may not necessarily be varied in such a case. For example, while the exposure may be carried out at a higher illumination intensity for a shorter period of time at one region, the exposure may be carried out at a lower illumination intensity for a longer period of time at another region. By doing so, the quantities of exposure (Illumination intensity× Exposure time) to both of these regions may be made equal.

Following are explanations of some of examples wherein the quantity of exposure is varied depending on the region.

For example, to the regions corresponding to the first region 3a in the liquid crystal material layer, the irradiation of light is applied at a maximum quantity of exposure. To the regions corresponding to the third region 3m in the liquid crystal material layer, the irradiation of light is applied at a smaller quantity of exposure as compared with the regions corresponding to the first region 3a. Further, to the regions corresponding to the second region 3a in the liquid crystal material layer, the irradiation of light is not applied at all. As a result, at the regions of the liquid crystal material layer where the irradiation of light is applied, the polymerization and/or crosslinking of the thermotropic liquid crystal compound generate while maintaining the state of orientation created by the mesogens.

In the polymerized product or crosslinked product of the thermotropic liquid crystal compound, the mesogen group thereof is immobilized. In the regions where the maximum quantity of exposure has been applied, the content (content rate) of the polymerized product or crosslinked product of the thermotropic liquid crystal compound becomes maximum ($P_{max}$) and the content of the unpolymerized product or uncrosslinked product of the thermotropic liquid crystal compound becomes minimum. As the quantity of exposure becomes smaller, the content of the polymerized product or crosslinked product becomes lower and the content of the unpolymerized or uncrosslinked thermotropic liquid crystal compound becomes larger.

Therefore, in the regions to which a larger quantity of exposure has been applied, the mesogens are immobilized at a higher degree and in the regions to which a smaller quantity of exposure has been applied, the mesogens are immobilized at a lower degree. Meanwhile, in the region where the quantity of exposure is zero, the mesogens are not immobilized at all.

More specifically, in the case wherein the rod-like liquid crystal is aligned to take a homeotropic orientation (case 1), when the refractive index of the liquid crystal in the direction of major axis is represented by "ne" and the direction of minor axis is represented by "no", the in-plane average refractive index "$n_a$" of the region irradiated with light in the step of patterning exposure and exhibiting anisotropy is approximately equal to "no" and the in-plane average refractive index "$n_i$" of the region which is not irradiated with light and exhibiting isotropy is approximately equal to $\{(ne+2\times no)/3\}$. Therefore, since the rod-like liquid crystal is usually defined as ne>no, the in-plane average refractive index "$n_i$" would become $n_i > n_a$. The in-plane average refractive index "$n_m$" of the third region would become $n_i \geq n_m \geq n_a$.

In the case wherein the rod-like liquid crystal is aligned to take a cholesteric orientation (case 2), the "$n_a$" is approximately equal to $\{(ne+no)/2\}$ and "$n_i$" would become approximately equal to $\{(ne+2\times no)/3\}$. As described above, since the rod-like liquid crystal is usually defined as ne>no, the index "$n_a$" would become $n_a > n_i$. The in-plane average refractive index "$n_m$" of the third region would become $n_a \geq n_m \geq n_i$.

Further, in the case wherein the disc-like liquid crystal is aligned to take a homeotropic orientation (case 3), when the refractive index of the liquid crystal in the direction normal to the surface of disc is represented by "ne" and the refractive index in in-plane direction of disc is represented by "no", the in-plane average refractive index "$n_a$" of the region irradiated with light in the step of patterning exposure and exhibiting anisotropy is approximately equal to "no" and the in-plane average refractive index "$n_i$" of the region which is not irradiated with light and exhibiting isotropy is approximately equal to $\{(ne+2\times no)/3\}$. Since the disc-like liquid crystal is usually defined as no>ne, the index "$n_a$" would become $n_a > n_i$. The in-plane average refractive index "$n_m$" of the third region would become $n_a \geq n_m \geq n_i$.

With respect to the light to be employed in the patterning exposure, it may be electromagnetic waves such as ultraviolet rays, visible light and infrared rays. In place of the electromagnetic waves, it is also possible to employ radial rays such as an electron beam, X-rays and gamma rays. In the patterning exposure, only one kind of these rays may be used or two or more kinds of these rays may be used.

As long as it is possible to selectively polymerize or crosslink a prescribed region as described above, the step of patterning exposure may be carried out by any optional method. For example, this step of patterning exposure may be carried out a plurality of times by a photomask. Alternatively, this step of patterning exposure may be carried out using a half-tone mask, a gray-tone mask or a wavelength-restricting mask. Instead of using a photomask, light flux may be scanned over a liquid crystal material layer. Furthermore, these methods may be optionally combined.

With respect to the third region, the exposure thereof may be carried out in such a manner that the region can be formed with two or more regions differing in the content of the reaction product. In this case, the irradiation of light can be applied to three or more regions of the liquid crystal material layer under varied exposure conditions, i.e., changing the quantity of exposure, for example. More specifically, the irradiation of light is applied to the region corresponding to the first region 3a at a maximum quantity of exposure. In order to obtain a sub-region which is smaller in content of the reaction product within the region corresponding to the third region 3m, the irradiation of light is applied thereto at a lower quantity of exposure. In order to obtain another sub-region which is larger in content of reaction product than that of the aforementioned sub-region but is smaller than $P_{max}$ of the region corresponding to the third region 3m, the irradiation of light is applied thereto at a quantity of exposure which is lower than the maximum quantity of exposure but larger than the aforementioned quantity of exposure applied to the first mentioned sub-region.

Alternatively, the exposure of light may be performed so as to create the third region 3m wherein the content of the reaction product is continuously varied from $P_{max}$ to zero between the boundary thereof to the first region 3a and the boundary thereof to the second region 3i. This manner of light exposure can be achieved by a method wherein enlarging a distance between the photomask and the liquid crystal material layer, thereby intentionally gradating the image of the photomask or by a method using a half-tone mask provided with regions where transmittance changes continuously from a maximum to zero. Alternatively, this manner of light exposure can be achieved by a method wherein interference is caused in the exposure light itself. More specifically, the exposure may be executed while changing the length and direction of the optical path using a half-mirror, thereby forming an interference fringe.

The content of the reaction product may be changed in a form of a sine wave throughout the first region 3a, the third region 3m and the second region 3i. When the content of the reaction product is changed in this manner, it would become advantageous in controlling the high-order diffracted light.

After finishing the step of patterning exposure, the resultant liquid crystal material layer is subjected to a development step. Namely, the liquid crystal material layer is heated to a temperature not lower than the phase transition temperature in which the thermotropic liquid crystal compound changes from the liquid crystal phase to an isotropic phase.

The mesogen moiety of the unreacted portion of the thermotropic liquid crystal compound is not immobilized. Therefore, when the liquid crystal material layer is heated to not lower than the phase transition temperature, the orientation of the mesogens of the unreacted compound is deteriorated. For example, the mesogens of the unreacted compound change from the liquid crystal phase to an isotropic phase. On the other hand, in the polymerized product or crosslinked product of the thermotropic liquid crystal compound, the mesogens thereof are immobilized. Therefore, in the region which has been irradiated with light, the orientation of the liquid crystal compound is not caused to change, so that the orientated region is developed in conformity with the exposure pattern.

Incidentally, in the region (the third region) containing the reaction product and unreacted thermotropic liquid crystal compound, the orientation of the mesogens of the unreacted thermotropic liquid crystal compound is disturbed due to the heating at this stage, resulting in the deterioration of orientation.

After the predetermined state of orientation differing region by region is accomplished, the unreacted compound is enabled to polymerize and/or crosslink while maintaining the state of orientation of the unreacted mesogens. For example, while keeping the liquid crystal material layer at a temperature higher than the phase transition temperature that enables the thermotropic liquid crystal compound to change from the isotropic phase to the liquid crystal phase, the liquid crystal material layer is entirely irradiated with light.

The liquid crystal material layer is irradiated with light at such a sufficient quantity of light exposure that enables the polymerization and/or crosslinking reaction to occur in almost all of the unreacted compound. As a result, the polymerization or crosslinking of the unreacted compound is caused to take place, thereby immobilizing the mesogens that have been changed in the state of orientation, resulting in the fixing of the pattern. Incidentally, in the region (the third region) containing the reaction product and unreacted thermotropic liquid crystal compound, the unreacted compound polymerizes and/or crosslinks while keeping the lowered orientation. As a result, a solidified liquid crystal layer having a prescribed pattern consisting of an isotropic phase region and an anisotropic phase region with an intermediate region being interposed therebetween, i.e., diffraction grating exhibiting a phase difference, can be obtained.

Incidentally, in some kinds of liquid crystal compound, a first phase transition temperature that brings about the phase change from the isotropic phase to the liquid crystal phase is lower than a second phase transition temperature that brings about the phase change from the liquid crystal phase to the isotropic phase. Therefore, depending on the actual case, the temperature of the liquid crystal material layer at the time of fixing by light may be set lower than the heating temperature at the step of development. However, in viewpoint of convenience, the temperature of the liquid crystal material layer at the time of fixing by light is generally set to not lower than the first phase transition temperature.

The polymerization and/or crosslinking of the unreacted compound may be carried out by other methods.

For example, when the unreacted compound, i.e., the thermotropic liquid crystal compound is a material which can be polymerized and/or crosslinked through the heating thereof at a polymerization and/or crosslinking temperature which is higher than the first phase transition temperature, the fixing thereof can be performed by heating in place of the fixing by light irradiation. More specifically, in place of the fixing process by light, the liquid crystal material layer may be heated to a temperature of not lower than the polymerization and/or crosslinking temperature thereof, thereby achieving the polymerization and/or crosslinking of the unreacted compound. As a result, a solidified liquid crystal layer can be obtained. Incidentally, the heating temperature in the step of development is not lower than the first phase transition temperature and lower than the polymerization and/or crosslinking temperature thereof.

In this case, in these two successive heating steps, at first, the region which has not been irradiated with light is transferred into an isotropic phase and hence brought into a substantially non-aligned state. Under this state, the second region $3i$ is created. The region which has been sufficiently irradiated with light is maintained without its prescribed orientation being disturbed even by the heating, thereby creating the first region $3a$. In the third region, there will be contained the unreacted compound at an amount which is lower than that contained in the second region but higher than that contained in the first region. In the second region and the third region, the polymerization and/or crosslinking proceed while substantially keeping each of their states. As a result, the pattern is fixed, thereby obtaining a phase type diffraction grating.

Alternatively, after finishing the development process, the fixing step by heating and the fixing step by light may be successively executed. Alternatively, after finishing the development process, the fixing step by light and the fixing step by heating may be successively executed. Further, after finishing the development process, the fixing step by heating, the fixing step by light and the fixing step by heating may be successively executed. It is possible, through a combination of the fixing step by light and the fixing step by heating as described above, to reliably carry out the polymerization and/or crosslinking of the unreacted compound. Therefore, it is possible to obtain a more reliable phase-type diffraction grating.

Incidentally, in the phase-type diffraction device according to this embodiment, an antireflection film may be attached to the surface (rear face) of the transparent substrate where the solidified liquid crystal layer is not formed. This antireflection film can be formed on the rear face of the transparent substrate by the techniques described, for example, in JP Patent No. 3490214, JP Patent No. 3965732 and JP Patent No. 4051740. Although this antireflection film may be formed subsequent to the formation of the solidified liquid crystal layer, it is preferable to execute the formation of this antireflection film before forming the solidified liquid crystal layer if there is a possibility of damaging the solidified liquid crystal layer by the step of forming this antireflection film.

Further, in the phase-type diffraction device according to the present invention, an antistatic film may be attached, after forming the solidified liquid crystal layer on the surface of the transparent substrate, to a surface of the solidified liquid crystal layer which is opposite to the surface where the transparent substrate is disposed. This antistatic film may be obtained by depositing a transparent conductive film such as indium tin oxide on the solidified liquid crystal layer by a resistance heat deposition method, electron beam deposition method, sputtering method, ion plating method, etc.

As described above, it is possible, according to the present invention, to relatively easily and stably obtain a phase-type diffraction device of high quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXPLANATION OF SYMBOLS

10 - - - Image pick-up device, 11 - - - Image pick-up lens, 1 - - - Diffraction device, 2 - - - Transparent substrate, 3 - - - Solidified liquid crystal layer, 3a- - - Optically anisotropic region, 3i- - - Optically isotropic region, 12 - - - Incident light, 13 - - - Diffracted light, 14 - - - Separated light spots.

What is claimed is:

1. A phase-type diffraction device comprising:
   a substrate having a front surface and a rear surface; and
   a solidified liquid crystal layer formed on the front surface of the transparent substrate and constituted by a continuous film containing at least a liquid crystal compound;
   wherein the solidified liquid crystal layer is constituted by first, second and third regions arranged periodically, the third region being interposed between the first region and the second region;
   the first region is optically anisotropic and the second region is optically isotropic;
   the third region is not optically isotropic, a degree of orientation of mesogens of the liquid crystal compound being lower than that of the first region; and
   an in-plane average refractive index $n_i$ of the second region is different from an in-plane average refractive index $n_a$ of the first region and the third region has a value between $n_i$ and $n_a$ as an in-plane average refractive index $n_m$.

2. The phase-type diffraction device according to claim 1, wherein the solidified liquid crystal layer has entirely no in-plane birefringence.

3. The phase-type diffraction device according to claim 1, wherein the third region is constituted by two or more sub-regions disposed neighboring, in-plane average refractive indexes being different in every sub-regions.

4. The phase-type diffraction device according to claim 1, wherein the in-plane average refractive index of the third region is the same with the $n_a$ at the boundary thereof to the first region and is the same with the $n_i$ at the boundary thereof to the second region and continuously change in a regions between the these boundaries.

5. The phase-type diffraction device according to claim 1, wherein
the liquid crystal compound is formed of rod-like liquid crystals;
the first region in the solidified liquid crystal layer has mesogens of the liquid crystal compound immobilized in a state of homeotropic orientation;
the third region has mesogens of the liquid crystal compound immobilized in a state of homeotropic orientation with a degree of orientation lower than that in the first region; and
the in-plane average refractive index $n_a$ of the first region, the in-plane average refractive index $n_i$ of the second region and the in-plane average refractive index $n_m$ of the third region satisfy the following relationship:

$$n_i \geq n_m \geq n_a \text{ (however, } n_i > n_a\text{)}.$$

6. The phase-type diffraction device according to claim 1, wherein
the liquid crystal compound is formed of rod-like liquid crystals;
the first region in the solidified liquid crystal layer has mesogens of the liquid crystal compound immobilized in a state of cholesteric orientation;
the third region is immobilized in a cholesteric orientation with a degree of orientation lower than that in the first region; and
the in-plane average refractive index $n_a$ of the first region, the in-plane average refractive index $n_i$ of the second region and the in-plane average refractive index $n_m$ of the third region satisfy the following relationship:

$$n_a \geq n_m \geq n_i \text{ (however, } n_a > n_i\text{)}.$$

7. The phase-type diffraction device according to claim 1, wherein
the liquid crystal compound is formed of disc-like liquid crystals;
the first region in the solidified liquid crystal layer has mesogens of the liquid crystal compound immobilized in a state of homeotropic orientation;
the third region is immobilized in a homeotropic orientation with a degree of orientation lower than that in the first region; and
the in-plane average refractive index $n_a$ of the first region, the in-plane average refractive index $n_i$ of the second region and the in-plane average refractive index $n_m$ of the third region satisfy the following relationship:

$$n_a \geq n_m \geq n_i \text{ (however, } n_a > n_i\text{)}.$$

8. The phase-type diffraction device according to claim 1, wherein the period defined by a pair of the first region and the second region with the third region being interposed therebetween is 20 μm or more.

9. The phase-type diffraction device according to claim 1, wherein the periodically arranged first and second regions constitute a checkerboard pattern.

10. The phase-type diffraction device according claim 1, wherein a thickness of the solidified liquid crystal layer is entirely uniform.

11. The phase-type diffraction device according claim 1, wherein the transparent substrate is provided, on its rear surface, with an antireflection film.

12. The phase-type diffraction device according claim 1, wherein the solidified liquid crystal layer is provided, on a surface opposite to the surface where the transparent substrate is disposed, with an antistatic film.

13. The phase-type diffraction device according to claim 12, wherein the antistatic film is formed of indium tin oxide.

14. An image pick-up apparatus comprising an image pick-up device provided with a large number of light-receptive pixels which are periodically arranged and with a phase-type diffraction device according to claim 1 as a low pass filter.

15. A method of manufacturing a phase-type diffraction device, comprising forming a solidified liquid crystal layer, directly or through another layer, on a front surface of a transparent substrate, the formation of the solidified liquid crystal layer comprising:
a film-forming step of forming, on the front surface of a transparent substrate, a liquid crystal material layer comprising a photo-polymerizable or photo-crosslinkable thermotropic liquid crystal compound, mesogens of the thermotropic liquid crystal compound configuring a prescribed oriented structure;
an exposure step of exposing at least two regions of the liquid crystal material layer to light, while leaving an unexposed portion, thereby forming in the liquid crystal material layer, a first region comprising a reaction product formed of the polymerized or crosslinked thermotropic liquid crystal compound at a content rate of $P_{max}$, a second region which is free from the reaction product and comprises unreacted thermotropic liquid crystal compound, and a third region comprising the reaction product and unreacted thermotropic liquid crystal compound, wherein a content rate of the reaction product being $P(P<P_{max})$;
thereafter, a developing step of heating the liquid crystal material layer to a temperature equal to or higher than a phase transition temperature at which the thermotropic liquid crystal compound changes from the liquid crystal phase to an isotropic phase, thereby disturbing the orientation of the mesogens of the unreacted thermotropic liquid crystal compound in the second and third regions to turn the second region into a state of isotropic phase and to turn the third region into a state wherein the orientation of the mesogen is reduced as a whole; and
a fixing step of polymerizing and/or crosslinking the unreacted compound while maintaining the state of isotropic phase in the second region and the orientation being kept reduced in the third region.

16. The method according to claim 15, wherein the exposure step, the exposure is performed in such a manner that the third region is constituted by at least two sub-regions which differ from each other in the content rate of the reaction product.

17. The method according to claim 15, wherein the exposure step, the exposure is performed in such a manner that the third region, in which the content rate of the reaction product changes continuously from $P_{max}$ to zero at a region between the boundary thereof to the first region and the boundary thereof to the second region, is formed.

18. The method according to claim 15, wherein the thermotropic liquid crystal compound comprises rod-like liquid crystals, and the prescribed oriented structure of the mesogens in the liquid crystal material layer is in homeotropic orientation.

19. The method according to claim 15, wherein the thermotropic liquid crystal compound comprises rod-like liquid crystals, the liquid crystal material layer further comprises a chiral agent, and the prescribed oriented structure of the mesogens is in cholesteric orientation.

20. The method according to claim 15, wherein the thermotropic liquid crystal compound comprises disc-like liquid crystals, and the prescribed oriented structure of the mesogens in the liquid crystal material layer is in homeotropic orientation.

21. The method according to claim 15, wherein the polymerizing and/or crosslinking of the thermotropic liquid crystal compound in the fixing step is induced by irradiation of light.

22. The method according to claim 15, wherein the thermotropic liquid crystal compound is a material that polymerizes and/or crosslinks when heated at a polymerization and/or crosslinking temperature higher than the phase transition temperature;

in the developing step, the orientation of the mesogens is disturbed by heating the liquid crystal material layer to a temperature which is lower than the polymerization and/or crosslinking temperature and not lower than the phase transition temperature; and in the fixing step, unpolymerized and uncrosslinked thermotropic liquid crystal compound are polymerized and/or uncrosslinked by heating the liquid crystal material layer to a temperature not lower than the polymerization and/or crosslinking temperature.

23. The method according to claim 22, wherein the heating temperature in the fixing step is 200° C. or more.

24. The method according to claim 15, wherein the liquid crystal material layer is formed as a continuous film having a uniform thickness.

25. The method according to claim 15, further comprising forming an alignment film on the front surface of the transparent substrate before forming the solidified liquid crystal layer.

26. The method according to claim 15, further comprising forming an antireflection film on a rear surface of the transparent substrate before the film-forming step.

27. The method according to claim 15, further comprising a step of forming an antistatic film on a surface of the solidified liquid crystal layer after the fixing process.

28. The method according to claim 27, wherein the formation of the antistatic film is performed by forming a thin film of indium tin oxide.

* * * * *

UNITED STATES PATENT AND TRADEMARK OFFICE
CERTIFICATE OF CORRECTION

PATENT NO. : 8,488,098 B2  
APPLICATION NO. : 13/137475  
DATED : July 16, 2013  
INVENTOR(S) : Sosuke Akao et al.

Page 1 of 1

It is certified that error appears in the above-identified patent and that said Letters Patent is hereby corrected as shown below:

In the Claims

Col. 19, Line 8, In Claim 4, after "between" delete "the".

Col. 19, Line 65, In Claim 10, after "according" insert -- to --.

Col. 20, Line 1, In Claim 11, after "according" insert -- to --.

Col. 20, Line 4, In Claim 12, after "according" insert -- to --.

Signed and Sealed this  
Twenty-fourth Day of December, 2013

Margaret A. Focarino  
*Commissioner for Patents of the United States Patent and Trademark Office*